Figure 1:
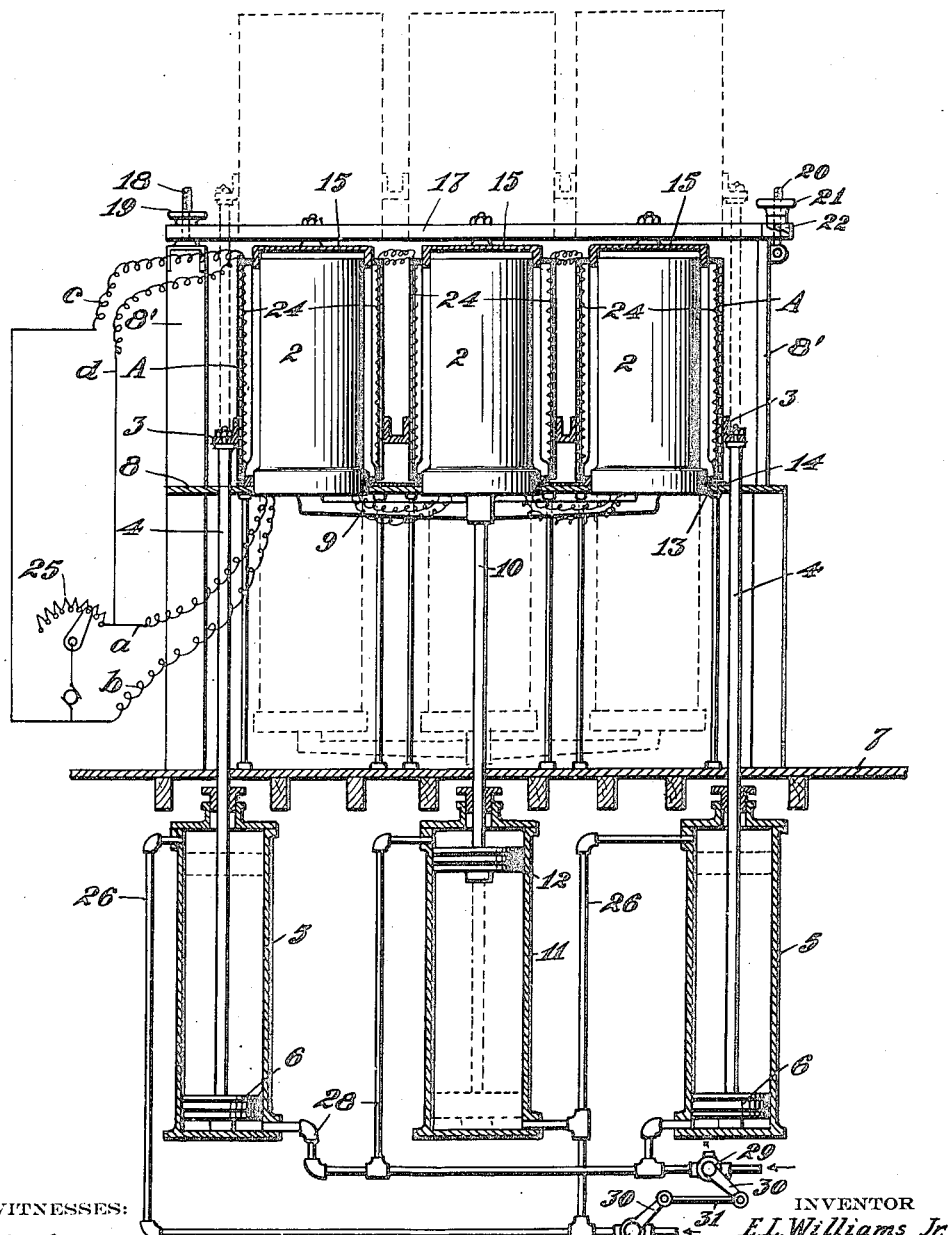

E. L. WILLIAMS, Jr.
MOLDING MACHINE.
APPLICATION FILED FEB. 5, 1913.

1,140,785.

Patented May 25, 1915.
2 SHEETS—SHEET 1.

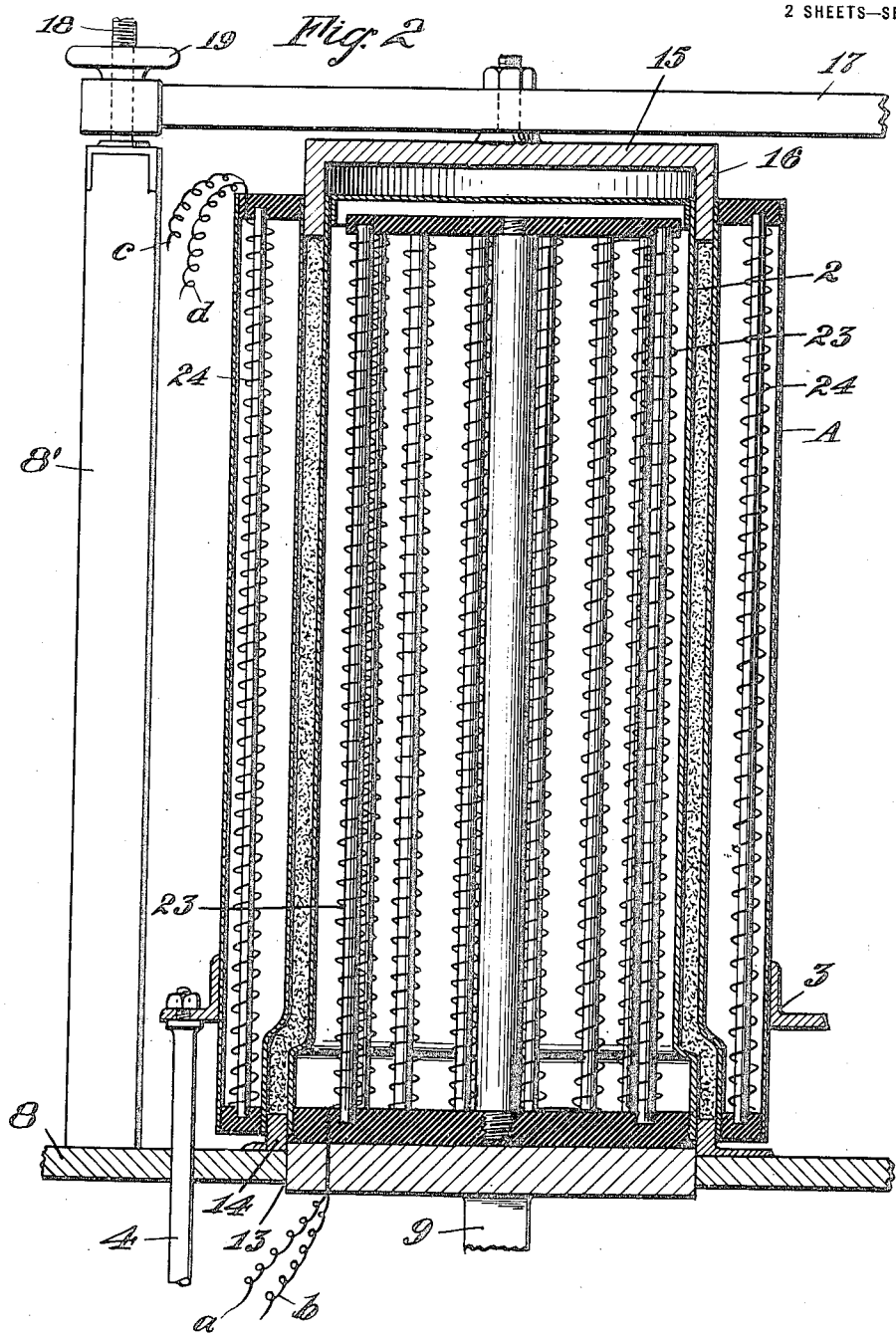

UNITED STATES PATENT OFFICE.

EDWARD L. WILLIAMS, JR., OF SANTA CRUZ, CALIFORNIA, ASSIGNOR OF ONE-HALF TO EDWARD L. WILLIAMS, SR., OF SANTA CRUZ, CALIFORNIA.

MOLDING-MACHINE.

1,140,785.   Specification of Letters Patent.   Patented May 25, 1915.

Application filed February 5, 1913. Serial No. 746,349.

*To all whom it may concern:*

Be it known that I, EDWARD L. WILLIAMS, Jr., a citizen of the United States, residing at Santa Cruz, in the county of Santa Cruz and State of California, have invented new and useful Improvements in Molding-Machines, of which the following is a specification.

This invention relates to a molding machine, and particularly pertains to a machine for molding plastic materials preliminary to baking.

It is the object of this invention to provide a machine which is particularly adapted for use in molding tile, terra cotta blocks, and the like, in which an external mold and a core is employed, and to provide means in a machine of this character for accelerating the set of the plastic materials in the molds to facilitate the speedy removal of the materials from the mold.

A further object is to provide means by which the surfaces of the materials in the molds may be troweled to avoid sticking and to close the pores on the surface of the molded body.

A further object is to provide a molding machine in which the uniform density and equal dimensions of the molded body will be insured.

Other objects will appear hereinafter.

The invention primarily resides in an external mold and a core therein, means for reciprocating the core and external mold simultaneously in opposite directions with relation to each other, means for compressing materials between the external mold and core, and means for heating the external mold and core to accelerate the set of plastic materials therebetween.

The invention further consists of the parts and the construction and combination of parts as hereinafter more fully described and claimed, having reference to the accompanying drawings, in which—

Figure 1 is a vertical section of the invention, partly in elevation. Fig. 2 is a detail vertical section of one of the molds.

In the drawings I have shown the invention as adapted for use in the manufacture of tile pipe; it being manifest, however, that it is equally applicable for use in molding other structures in which a core is employed.

Referring to the drawings A indicates an external mold conforming on its inner face to the shape of the exterior face of the tile to be molded, and 2 indicates a hollow core adapted to be inserted in the external mold A, the outer face conforming to the inner face of the mold A and spaced a distance therefrom corresponding to the thickness of the tile.

The external mold A is rigidly mounted on a frame or carriage 3 which is supported on rods 4 extending into cylinders 5 and having pistons 6 on their lower ends. The cylinders 5 are here shown as disposed below a floor 7, and the frame 3 is positioned over a table 8 a suitable distance above the floor 7. The external molds A are designed to be reciprocated in a vertical direction above the table 8 by reciprocating the pistons 6 in the cylinders 5, as will be later described.

The cores 2 are supported upon a frame 9 mounted on a rod 10 extending into a cylinder 11 and having a piston 12 on its lower end. The core 2 is designed to be reciprocated in a vertical direction by the reciprocation of the piston 12 in the cylinder 11 to move the core in and out of the external mold A from the underside of the table 8.

It is manifest that as many external molds A and cores 2 may be mounted on their respective carriages 3 and 9 as occasion may require.

The table 8 is formed with openings 13 through which the cores 2 are adapted to pass from one side of the table top to the other, and is designed to receive and support pallets 14 which surround the openings 13, and are adapted to support the molded article when the mold A and core 2 are removed therefrom, as will be later described.

When the parts are in their normal position, the external molds A will be disposed with their lower ends surrounding the pallets 14 and the cores 2 will be disposed in their uppermost position with their upper ends flush with the upper open ends of the external molds A. The space between the molds A and cores 2 is designed to be closed by means of caps 15 having downwardly extending annular flanges 16 on their underside, which are adapted to project a short distance into the space between the external molds A and cores 2.

The caps 15 are mounted upon a movable supporting frame 17, pivoted on one side to a threaded stud 18 carrying a nut 19, and is designed to be rigidly clamped against movement by means of a pivoted, threaded stud 20 carrying a nut 21, which stud is adapted to extend into a notch or slot 22 on the frame 17. The studs 18 and 20 are carried on standards 8', rigidly mounted on and carried by the table 8.

When it is desired to fill the space between the molds A and the cores 2, the frame 17 is swung horizontally on the stud 18 to a position at one side of the molds; the nuts 19 and 21 being loosened to permit the stud 20 being rocked on its pivot and disengaged from the slot 22, and to allow the frame 17 being elevated a short distance on the stud 18 so as to withdraw the depending flanges 16 on the caps 15 from the molds and allow the frame 17 to be swung horizontally, clear of the molds.

Mounted within the hollow core is a series of electric heating coils 23 of any suitable description; similar heating coils 24 being provided in a hollow space formed for that purpose in each of the external molds A; the heating coils 23 and 24 connecting through conductors $a-b$ and $c-d$ to a suitable source of electrical supply through a rheostat switch 25.

Connecting with the upper ends of the cylinders 5 are pipes 26 which lead to any suitable source of fluid pressure supply, preferably water or oil, through a valve 27 of any suitable description; the pipe 26 also opening to the lower end of the cylinder 11 below the piston 12 therein. Connecting to the upper end of the cylinder 11 and to the lower ends of the cylinders 5 are pipes 28 which lead to a suitable source of fluid pressure supply through a valve 29 of any desired construction. The valves 27 and 29 are adapted to be operated in unison so as to open one of the pipes 26 or 28 to an exhaust and simultaneously open the other pipe to the source of fluid pressure supply. This is accomplished by connecting the operating levers 30 of the valves 27 and 29 together by means of a link 31. When the valves 27 and 29 are in such position, as to admit fluid under pressure into the pipe 26 and open the pipe 28 to the exhaust, the piston 12 will be forced to its uppermost position in the cylinder 11 and the pistons 6 will be forced to their lowermost position in the cylinders 5. When the pistons 6 and 12 are in these positions shown in Fig. 1, the external molds A will be in their lowermost position with their lower ends encircling the pallets 14, and the cores 2 will be in their uppermost position extending into the external molds A. The molds are then in readiness to receive the materials to be molded, which are in a liquid state of about the consistency of cream, which fluid is poured into the space between the molds A and the cores 2 at the upper end thereof. When the spaces between the molds A and the cores 2 are filled, the frame 17 is swung on the stud 18 to position the caps 15 over the molds. The stud 20 is engaged with the notch 22, whereupon the nuts 19 and 21 are screwed downward on their respective studs 18 and 20 to force the frame 17 and the caps 15 thereon in a downward direction; the depending flanges 16 pressing against the plastic materials between the external molds A and cores 2. The rheostat switch 25 is then operated to cause electrical current to flow through the heating coils 23 and 24 and thereby heat the molds to cause the plastic materials in the molds to quickly set. The heating of the plastic materials causes them to expand within the molds, which, by reason of the materials being tightly inclosed in the mold, insures a density of the molded article. When the materials are sufficiently set in the molds, the valves 27 and 29 are operated in unison to alternately open and close the pipes 26 and 28 to the fluid pressure supply and exhaust, to cause the pistons 6 and 12 to reciprocate a short distance in the cylinders 5 and thereby cause the carriage 3 carrying the molds A, and the carriage 9 carrying the cores 2 to move up and down. This action causes the molds A and the cores 2 to move in opposite directions in relation to each other in a series of short reciprocating strokes, the action of which is to trowel the inner and outer surfaces of the molded plastic material between the exterior molds A and the cores 2. This operation serves to close the pores in the outer and inner surfaces of the molded material. When the molded material has been sufficiently troweled the frame 17 is released and removed from above the molds whereupon the valves 27 and 29 are operated to cause the liquid to enter the upper end of the cylinder 11 and the lower ends of the cylinders 5, and thereby cause the frame 9 carrying the cores 2 to move to its lowermost position, and the frame 3 carrying the molds A, to its uppermost position as indicated in dotted lines in Fig. 1. The cores 2 and the molds A in moving away from the set plastic materials therebetween, leave the latter supported on the pallets 14, which are removed with the plastic forms thereon, and other pallets replaced on the table 8 in readiness for another operation. The electric current supplied to the heating coils 23 and 24 is controlled by the switch 25, and is turned on and off as occasion may require. When it is desired to perform another molding operation, the valves 27 and 29 are operated to restore the exterior molds A and the cores 2 to the position shown in full lines in Fig. 1, whereupon the frame 17 is swung to one side, as previously described, to permit of another charge of the plastic material being introduced into the molds.

By confining plastic material within the molds between the pallets 14 and the caps 15, a uniform length of the molded body is insured, and by reciprocating the cores and exterior molds in opposite directions in relation to each other on each side of the molded body, sticking of the molded body to the molds is prevented. The plastic materials being held between the pallets and caps during the troweling operation are prevented from becoming elongated. By heating the cores 2 and the exterior molds A, a rapid set of the plastic materials is obtained, which facilitates speed of operation in handling the wet mixture employed, and enables the materials being quickly molded and prepared for baking.

Having thus described my invention, what I claim and desire to secure by Letters Patent is—

1. The combination in a molding machine of an external mold, a reciprocating carriage carrying the mold, a core adapted to extend into the mold, a reciprocating frame on which said core is mounted, heating coils within and exterior to the mold form, and means for reciprocating the carriage and frame by which the mold and core may be moved simultaneously in opposite directions in relation to each other, said means including cylinders having pistons and piston rods connecting respectively with the molds and cores, and adapted to be propelled in opposite directions.

2. The combination in a molding machine of an exterior mold, a carriage upon which the mold is mounted, a core adapted to extend into the mold, a carriage on which the core is mounted, a movable cap mounted above the carriage for compressing materials between the mold and core, heating coils within and exterior to the mold forms, and pressure impelled pistons and rods, for reciprocating the carriages to move the mold and core simultaneously in opposite directions in relation to each other.

3. In a molding machine the combination of a mold open at both ends, a vertically movable carriage on which the mold is mounted, a pallet adapted to be surrounded by the lower end of the mold, means for supporting the pallet, said pallet and supporting means formed with openings leading to the interior of the mold, a core adapted to extend through the openings in the pallet and pallet-supporting means into the interior of the mold, a frame adapted to be reciprocated in a vertical direction to insert and withdraw the core from the mold, means for closing the upper end of the mold adapted to compress the materials between the mold and core, heating coils within and exterior to the mold form for accelerating the set of the materials therebetween, and means for reciprocating the mold and core simultaneously in opposite directions in relation to each other.

4. In a molding machine, the combination with an exterior mold and a core, of means for heating the mold and core, means for reciprocating the mold and core simultaneously in opposite directions in relation to each other, and means for holding the plastic body between the mold and core against longitudinal movement.

5. The combination in a molding machine of an external mold, a reciprocating carriage carrying the mold, a core adapted to extend into the mold, a reciprocating frame on which said core is mounted, heating coils within and exterior to the mold forms, means for reciprocating the carriage and frame by which the mold and core may be moved simultaneously in opposite directions with relation to each other, adjustable caps for holding the plastic body between the mold and core against individual movement.

6. In a molding machine, the combination of an exterior mold, a core, means for reciprocating the mold and core simultaneously in opposite directions with relation to each other, means for holding a plastic body between the molds and the core against longitudinal movement, said means comprising a pallet, and a cap adjustable with relation to the pallet.

7. A molding machine of the character described, including an exterior mold, a core, means for reciprocating the mold and core simultaneously in opposite directions, a pallet located at the bottom of the interspace, and a cap at the top, a frame swiveled at one side and adapted to press upon the cap and screw-threaded nuts by which the frame may be forced down to press upon the cap.

8. In a molding machine, on inner and an outer form, means to support the plastic material against movement with either of said forms, and means for simultaneously and positively moving each of said forms in opposite directions whereby both the inner and outer faces of the article molded are troweled by the form movements in one operation.

9. In a molding machine, an inner and an outer form, means to support the plastic material against movement with either of said forms, and means for imparting a series of reciprocating strokes to each of the forms in opposite directions and in unison whereby both the inner and outer faces of the article molded are troweled by the form movements in one operation.

10. In a molding machine, inner and outer forms having relative sliding movement, means to reciprocate each of the forms in unison and in opposite directions, and means to support the plastic body in relatively stationary position during the reciprocating movements of the forms.

11. In a molding machine, independently movable inner and outer forms, means to support the plastic material against movement with either of said forms, independent heating means for each form which partakes of the movement thereof, and means to move the forms in unison and in opposite directions and therewith the respective heating means.

12. In a molding machine, inner and outer forms, heating means surrounding the outer form and other heating means within the inner form, means to support the plastic material against movement with either of said forms, and means to effect relative movement between the forms, and therewith the heating means of the respective forms, whereby to trowel and heat the inner and outer faces of the plastic material simultaneously.

13. In a molding machine, inner and outer forms, means to hold the plastic body relatively stationary, means to reciprocate the forms in opposite directions while the plastic body remains stationary and means to heat each of said forms throughout the reciprocating movements thereof.

14. In a molding machine, an inner form, heating means on the interior thereof, an outer form, means to support the plastic material against movement with either of said forms, and heating means for the outer form surrounding the heating means for the inner form and the latter, and means to reciprocate the forms in opposite directions, and therewith the heating means of the forms.

In testimony whereof I have hereunto set my hand in the presence of two subscribing witnesses.

EDWARD L. WILLIAMS, Jr.

Witnesses:
C. G. DAKE,
L. J. DAKE.